United States Patent
Heinzer

[11] 3,899,069
[45] Aug. 12, 1975

[54] ROTARY TRANSFER APPARATUS FOR GROUPING ARTICLES

[75] Inventor: Hans Heinzer, Beringen, Switzerland

[73] Assignee: Sig Schweizerische Industrie-Gesellschaft, Neuhausen am Rheinfall, Switzerland

[22] Filed: July 18, 1974

[21] Appl. No.: 489,719

[30] Foreign Application Priority Data
July 18, 1973 Switzerland.................. 10494/73

[52] U.S. Cl. .................................. 198/25; 198/34
[51] Int. Cl.² .................................. B65G 47/00
[58] Field of Search .. 198/34, 31 R, 31 AA, 31 AB, 198/31 AC, 241, 242, 243, 235, 25, 20 R

[56] References Cited
UNITED STATES PATENTS

| | | | |
|---|---|---|---|
| 2,393,961 | 2/1946 | Almgren | 198/25 X |
| 2,760,620 | 8/1956 | Hull et al. | 198/25 |
| 3,303,926 | 2/1967 | Pohl | 198/25 X |

FOREIGN PATENTS OR APPLICATIONS

| | | | |
|---|---|---|---|
| 1,363,024 | 7/1963 | France | 198/242 |

Primary Examiner—Evon C. Blunk
Assistant Examiner—James M. Slattery
Attorney, Agent, or Firm—Spencer & Kaye

[57] ABSTRACT

An apparatus for grouping articles has a plurality of collector pushers brought successively in a work position at the discharge end of an inlet conveyor and caused to execute a work stroke of increasing velocity in the feed direction of the inlet conveyor. Each collector pusher has a retaining edge behind which, during the work stroke, a group of articles of predetermined number is formed and a pushing edge which is normal to the retaining edge and which, during the work stroke, displaces a previously formed group of articles to an outlet conveyor in a direction transversal to the feed direction.

10 Claims, 7 Drawing Figures

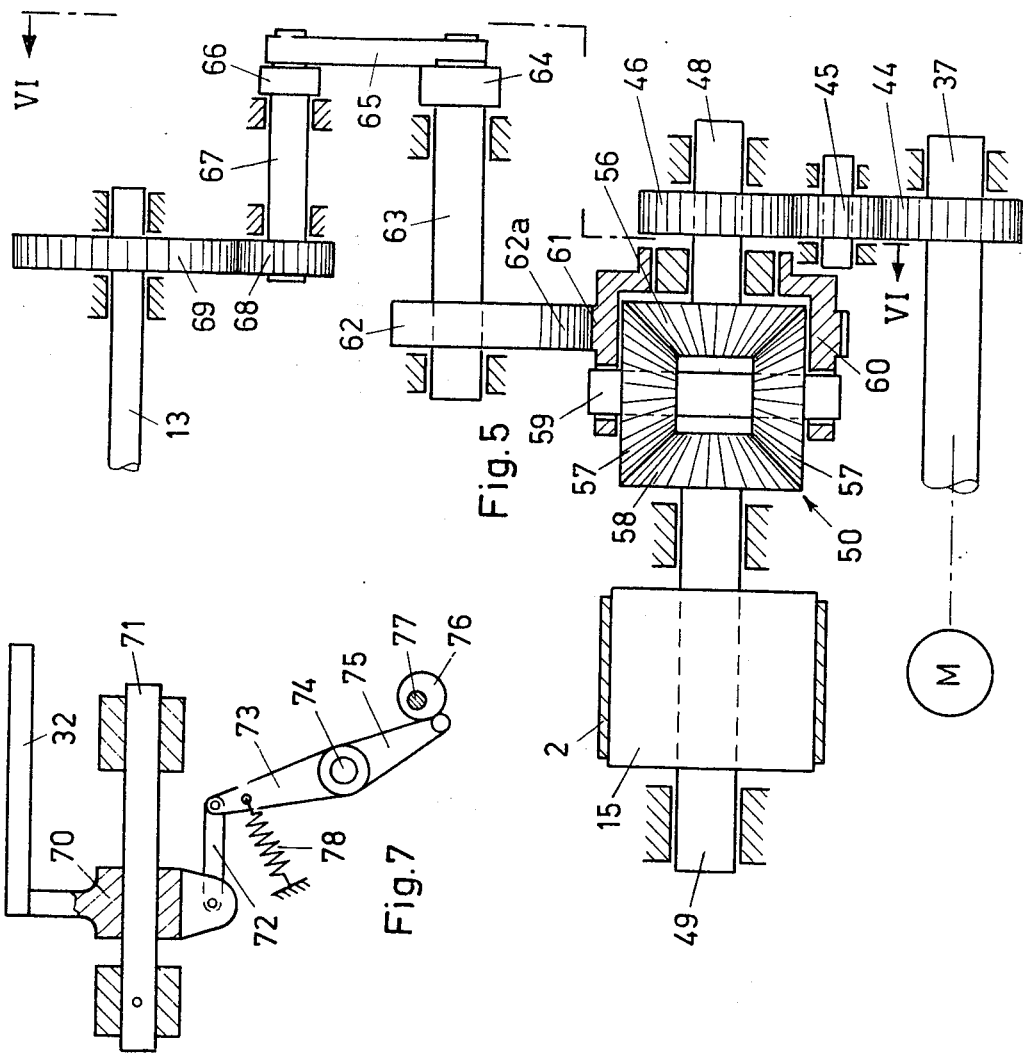
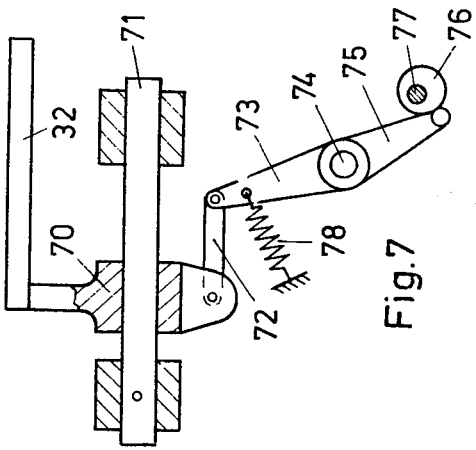
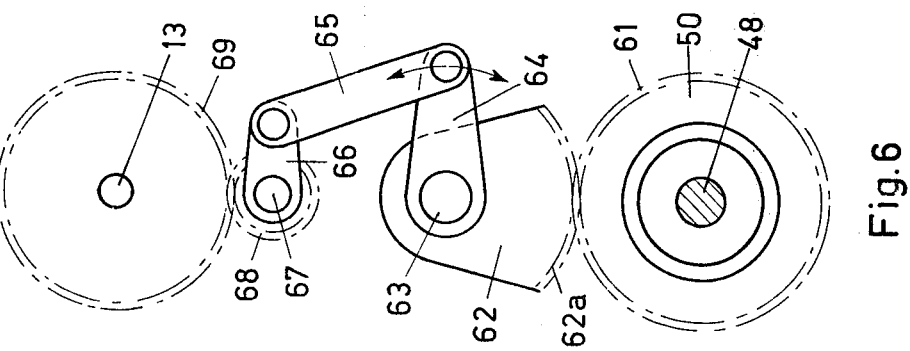

ROTARY TRANSFER APPARATUS FOR GROUPING ARTICLES

BACKGROUND OF THE INVENTION

This invention relates to an apparatus for grouping and forwarding articles and is of the type in which an article group formed at the discharge (downstream) end of an inlet conveyor is, by the edge of a pusher which at least during its work stroke moves transversely to the feed direction of the inlet conveyor, displaced onto an outlet conveyor which is codirectional with the inlet conveyor.

In a known apparatus of the above-outlined type, at a certain distance from the discharge end of the inlet conveyor there is provided a stationary abutment, in the zone of which articles accumulate, the number of which is determined by the afore-noted distance. Subsequently, the accumulated group of articles is engaged by the pusher edge of a linearly reciprocating pusher and is displaced onto the outlet conveyor on which the initial velocity of the articles is zero. In order to avoid a sharp impact of the articles at the stationary abutment, the speed of the inlet conveyor should not be too high: as each group is formed, its speed should slowly drop to zero or to a value close to zero. Further, the group of articles should not be accelerated on the outlet conveyor in an impact-like manner because this could lead to the damaging of the articles. An operation conforming to these requirements, however, leads to the disadvantage that the output of the apparatus, that is, the number of the groups formed per minute, is relatively small. It is apparent that such output also depends on the nature and dimensions of the articles — such as chocolate bars — which are to be packaged in groups.

SUMMARY OF THE INVENTION

It is an object of the invention to provide an apparatus of the above-outlined type which has a significantly increased output with respect to prior art structures.

This object and others to become apparent as the specification progresses, are accomplished by the invention according to which, briefly stated, an apparatus for grouping articles has a plurality of collector pushers brought successively in a work position at the discharge end of an inlet conveyor and caused to execute a work stroke of increasing velocity in the feed direction of the inlet conveyor. Each collector pusher has a retaining edge behind which, during the work stroke, a group of articles of predetermined number is formed and a pushing edge which is normal to the retaining edge and which, during the work stroke, displaces a previously formed group of articles to an outlet conveyor in a direction transversal to the feed direction.

In the structure according to the invention as outlined above, the collector pushers thus have a velocity component not only in a direction normal to the direction of feed but also a velocity component in the conveying direction itself, so that the articles can be moved from the inlet conveyor with a significantly greater speed toward the retaining edge which is retreating in front of them. Further, the group of articles deposited on the outlet conveyor does not have zero speed but has a speed which is equal to the maximum velocity of the collector pusher in the direction of feed.

BRIEF DESCRIPTION OF THE DRAWINGS

FIG. 5 is a schematic view of a differential gear provided within the apparatus.

FIG. 6 is a sectional view taken along the line VI—VI of FIG. 5.

FIG. 7 is a schematic view of the control mechanism for the guide.

DESCRIPTION OF THE PREFERRED EMBODIMENT

Figure 1:
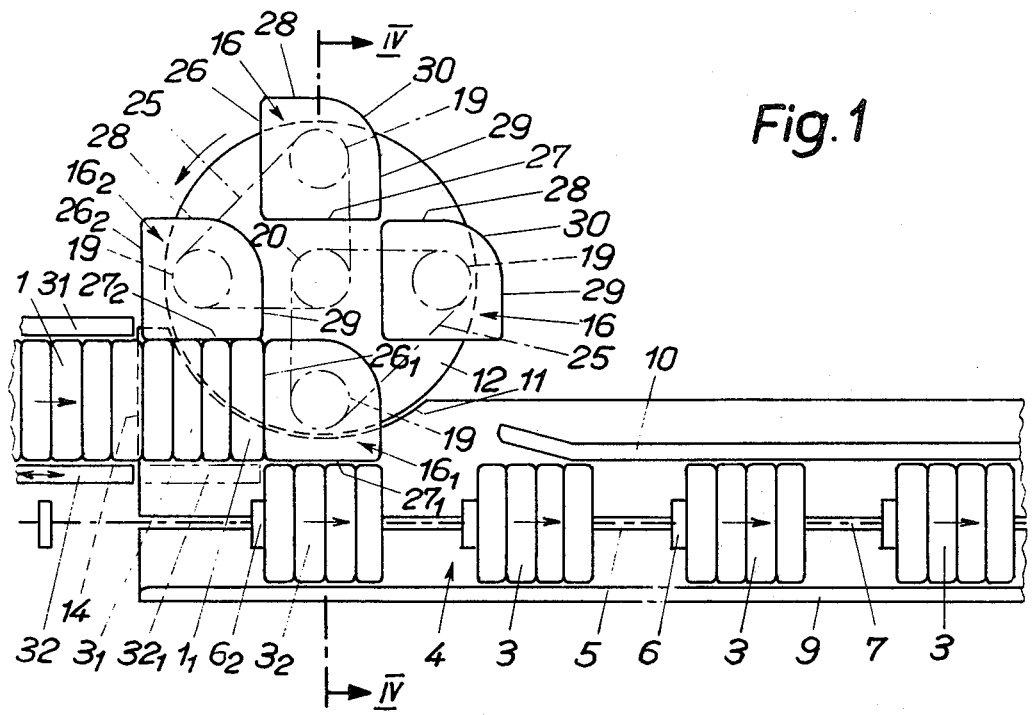
FIG. 1 is a schematic top plan view of a preferred embodiment of the invention depicting one operational phase.
Figure 2:
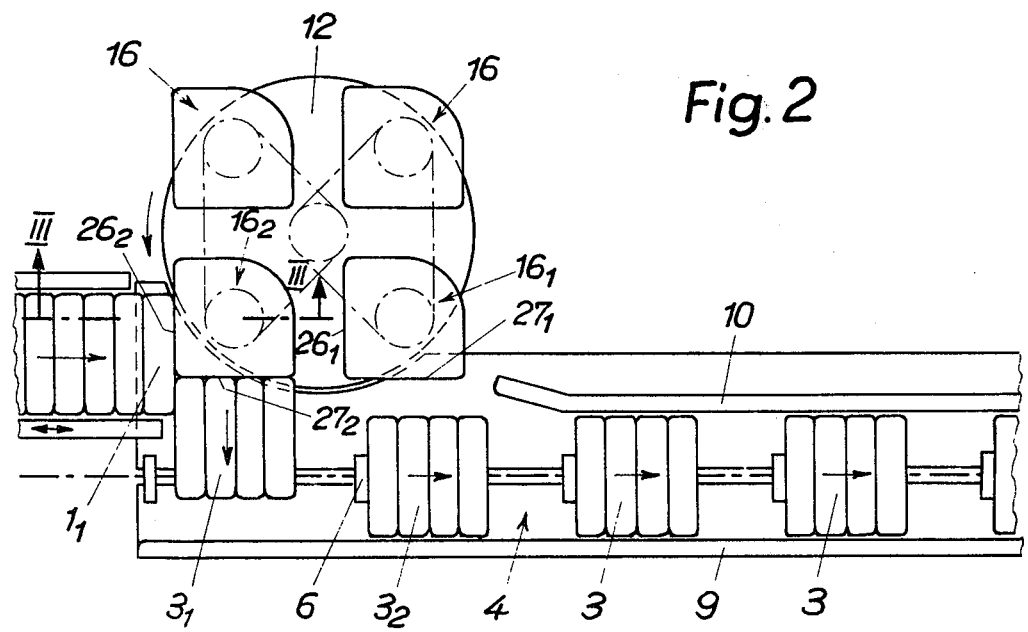
FIG. 2 is a schematic top plan view of the same embodiment in another operational phase.

The apparatus illustrated in FIGS. 1 and 2 and constituting a preferred embodiment of the invention serves for forwarding articles in separate groups 3, each formed, for example, of four articles, to an outlet conveyor 4. The articles 1, which may be, for example, chocolate bars of prismatic section, are introduced into the apparatus by means of an endless belt conveyor 2.

Figure 4:
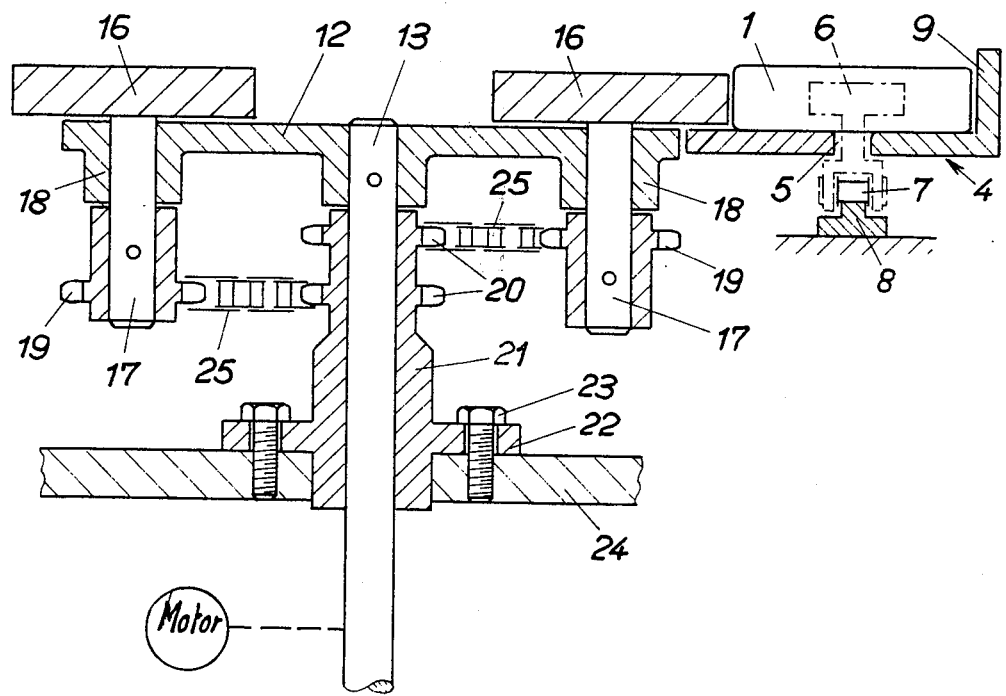
FIG. 4 is an enlarged sectional view taken along line IV—IV of FIG. 1.

The outlet conveyor 4 is provided with a longitudinally extending slot 5 through which project carrier members 6 which are affixed, uniformly spaced, to an endless chain 7. The upper reach of the chain 7 is, as best seen in FIG. 4, supported on a rail 8. The outlet conveyor 4, which is further provided with two lateral guides 9 and 10 for the groups 3, has at the beginning of that side which is opposite from the somewhat longer guide 9, an arcuately shaped cutout 11. Into this cutout there projects a planar rotary disc 12 which is affixed to the upper end of a vertical shaft 13 driven with constant speed by a motor only symbolically illustrated in FIG. 4. The upper face of the rotary disc 12 is coplanar with the upper face of the outlet conveyor 4.

Figure 3:
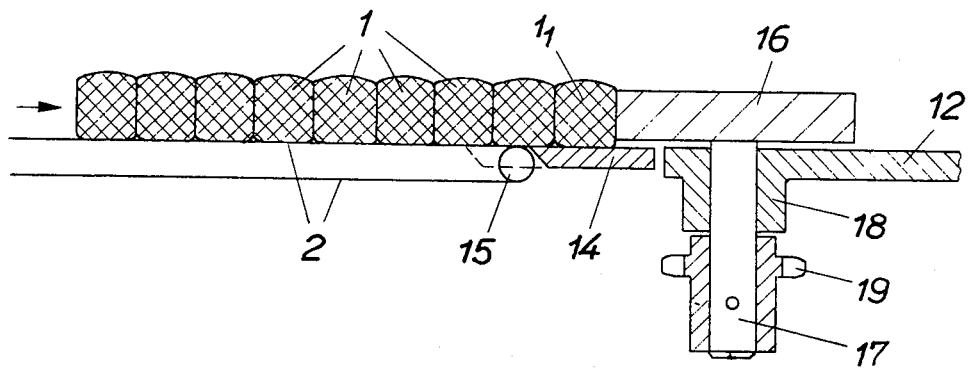
FIG. 3 is an enlarged sectional view taken along line III—III of FIG. 2.

The outlet conveyor 4 has an initial portion 14 which is located immediately downstream of a belt-supporting end roller 15 (FIG. 3) which, in turn, is positioned at the discharge end of the inlet converyor 2. In this manner, the articles 1 are transmitted from the belt 2 to the initial portion 14. When an article $1_1$ is present on the initial portion 14, this signalizes that upstream of this article there are further articles 1 which pushed the article $1_1$ on the initial portion 14, because the latter is wider than the article $1_1$. By dimensioning the initial portion 14 of the outlet conveyor 4 in the above manner and thus determining the position of the end roller 15 of the conveyor belt 12, it is provided that the pushers $16_2$, during their work strokes, each time move an entire group (each consisting of four articles), provided that at the beginning of the stroke one article $1_1$ engages the retaining edge of the pusher $16_1$.

The conveyor 4 is, with respect to the endless belt 2, laterally offset by a distance corresponding to the length of an article 1. When the apparatus is in operation, each time the four leading articles 1 are, as a unit, displaced through this distance laterally and placed in front of one of the carriers 6. For this operation there are provided four collector pushers 16 each of which is mounted on a stub shaft 17 which is rotatably held at the underside of the rotary disc 12. To the lower end of each stub shaft 17 there is affixed a chain sprocket 19. Two sprockets 20 are ganged together on a common hub 21 mounted on the shaft 13 and are stationary with respect to the machine. For this purpose a flange 22 of the hub 21 is affixed by means of screws 23 to a frame component 24 of the apparatus. One pair of sprockets 19 is disposed at the level of one of the sprockets 20, while the other pair of sprockets 19 is at the same level as the other sprocket 20. The sprockets 19, 20 of the same levels are interconnected by separate endless chains 25. The result of this arrangement is that upon rotation of the disc 12, the sprockets 19 are rotated in an opposite direction with respect to the rotary disc 12 and with the same velocity so that each collector pusher 16 executes a purely translational movement. In this movement, the center of each collector pusher moves along a circle, whereas its two mutually perpendicular lateral edges 26 and 27 always remain parallel to themselves. The other edges 28 and 29 of each collector pusher 16 are in part parallel with the edges 27 and 26, respectively, and are in part formed by a transitional arc 30. The shape of the edges 28 and 29 and that of the arc 30 is not critical, it merely should ensure that the collector pushers are not obstructed in their movements.

On each side of the inlet conveyor 2 there are provided guides 31 and 32. The guide 31 is stationary, while the guide 32 which lies on the same side as the carrier chain 7, is movable back and forth in the longitudinal direction.

In FIG. 7 the control mechanism for the guide 32 is illustrated. The latter is affixed to a slide 70 which, for example, may be slideably arranged on a shaft 71 having a square cross section.

A rod 72 is linked to the slide 70 and is hinged to the arm 73 of a double-armed lever 73, 75. The double-armed lever 73, 75 may be disposed to pivot about a shaft 74.

A spring 78 urges the outer end of the arm 75 into contact with an eccentric 76 which is affixed to a shaft 77. The shaft 77 is preferably connected to the shaft 67 and thus also rotates at four times the speed of the shaft 13. In this manner the previously described periodical movement with respect to the rotary disc 12 is obtained.

In the description that follows, the operation of the above-described apparatus will be set forth.

In the operational phase illustrated in FIG. 1, an article group $3_1$ of four pieces is laterally engaged by the lateral edge $27_2$ (the "pushing edge") of the pusher $16_2$ and shifted into axial alignment with the output conveyor 4. It is noted that the leading article $1_1$ engages the lateral edge $26_1$ (the "retaining edge") of the pusher $16_1$. The preceding group $3_2$ has been previously brought into the axis of the conveyor 4 and is at this moment grasped by the carrier $6_2$. The pushing edge $27_1$ of the pusher $16_1$ now begins its retreat from the axis of the conveyor 4. At the beginning of the displacement of the group $3_1$ the latter is partially on the initial portion 14 and partially on the rotary disc 12. It is thus seen that considering one and the same collector pusher 16, during its work stroke it forms a group of articles with the aid of its retaining edge 26 and, at the same time, with its pushing edge 27, displaces the precedingly formed group of articles transversely to the feed direction onto the outlet conveyor 4. In order to prevent that a successive article $1_1$ is carried away in a lateral direction by the last article of the engaged group or by the retaining edge 26 of the corresponding pusher 16 by virtue of friction, the lateral guide 32 moves in the feeding direction approximately with the same speed as the retaining edge 26. In this manner, the lateral guide 32 reaches, immediately preceding the operational phase illustrated in FIG. 1, its dash-dotted position $32_1$ from which it is then withdrawn rapidly into its full-line position to permit the displacement of the group $3_1$. The forces directed transversely to a successive article $1_1$ significantly decrease as the pusher stroke is in progress. Therefore, in practice it is sufficient in most cases if the guide 32 follows only one part of the longitudinal stroke of the feeding pusher. The motion components of the pusher 16 in the feed direction vary: the component is zero in the position of the pusher $16_2$, then increases during its work stroke up to the position of the pusher $16_1$ to a maximum value and the, during its return stroke, reverses its direction and decreases to zero. It is advantageous if the inlet conveyor 2 is driven not with a uniform speed but with a speed which at all times slightly exceeds the velocity component of the pusher 16 during the work stroke. It is to be understood that the belt speed should not suddenly drop from a maximum value to zero. Thus, the velocity of the belt 2 changes periodically: four times for each revolution of the rotary disc 12 it relatively slowly increases from a minimum value to a maximum value and then rapidly drops to the minimum value. The difference between the speed of the inlet conveyor belt 2 and the corresponding velocity component of the pushers 16 is compensated by the fact that the articles 1 slide on the belt 2. If the belt 2 were driven with a constant speed which corresponds to the maximum value of the velocity component of the pushers 16, the sliding motion of the articles 1 on the belt 2 would be of such a magnitude that more delicate articles 1 could easily be damaged.

The variable speed of the end roller 15 is advantageously obtained by the use of a gear such as schematically illustrated in FIGS. 5 and 6.

The main motor of the machine drives the shaft 37 which imparts its rotary movment to a spur gear wheel 44 which engages an intermediate gear wheel 45. The latter engages a further gear wheel 46 which is secured to a common shaft 48 together with the bevel gear wheel 56 of a differential gear 50.

The bevel gear wheel 56 imparts its uniform rotary movement via a pair of bevel gear wheels 57 to a bevel gear wheel 58 affixed to a common shaft 49 together with the end roller 45.

The pair of bevel gear wheels 57 are secured to a common shaft 59 which is disposed in the cage 60 of the differential gear 50. The cage 50 is provided with teeth 61 which serve to engage further teeth 62a provided on a segment 62 which is firmly secured to a shaft 63. A crank 64 is arranged on one end of the shaft 63. One end of a rod 65 is swivellably attached to the crank 63, its other end being movably connected to an arm 66. The arm 66 is affixed to a shaft 67 which is disposed in the chassis of the apparatus.

The shaft 67 is further provided with a gear wheel 68 for engaging another gear wheel 69. The gear ratio between the two gear wheels 68 and 69 is 1 : 4. The gear wheel 69 is affixed to the common shaft 13 together with the rotary disc 12.

Upon rotation of the arm 66 an oscillating movement is imparted to the crank 64. In FIG. 6 this movement is indicated by a double arrow. Said oscillating movement is conveyed to the cage 60 of the differential gear 50 via the shaft 63 and the gear wheel 62 affixed thereto. In this manner an oscillating movement is superimposed on the basic uniform rotary movement imparted by the shafts 37 and 48. This oscillating movement is conveyed to the shaft 49 and induces the previously described changing velocity of the belt 2.

The above-described apparatus is relatively simple and therefore it can be manufactured and assembled in an economic manner. Above all, however, it operates with the greatest reliability and with an output which, by far, could not be accomplished with grouping apparatuses known heretofore. It is a further advantage of the apparatus according to the invention that by means of a simple replacement of only a few components, it may be converted to handle articles and/or groups of other dimensions. The number of the collector pushers 16 on the rotary disc 12 is not limited to four as shown in the preferred embodiment. Further, the cyclical translational movement of these pushers may be accomplished by means other than sprockets 19, 20 and chains 25.

In the described embodiment two pushers each are driven by a common driving mechanism 19, 20, 25. It is to be understood that it is within the scope of the invention to provide a separate individual drive means for each pusher if, for example, sufficient space is available or, on the contrary, all the pushers could be driven by a single drive mechanism.

It will be understood that the above description of the present invention is susceptible to various modifications, changes and adaptations and the same are intended to be comprehended within the meaning and range of equivalents of the appended claims.

I claim:

1. An apparatus for grouping articles, the apparatus including an inlet conveyor for carrying non-grouped articles, the inlet conveyor having a feed direction and a discharge end; and an outlet conveyor for carrying the grouped articles, comprising in combination:
   a. a plurality of spacedly supported collector pushers each having a pushing edge and a retaining edge normal to said pushing edge;
   b. means for successively bringing said collector pushers into a work position at the beginning of a work stroke in alignment with the feed direction of said inlet conveyor at the discharge end thereof;
   c. means for moving each collector pusher with an increasing speed in the feed direction during the work stroke of the collector pusher for forming a first group of articles of predetermined number backed up behind said retaining edge; and
   d. means for moving each collector pusher, during its work stroke, in a direction transverse to the feed direction for displacing, with said pushing edge, a second, previously formed group of articles onto a conveying path of said outlet conveyor.

2. An apparatus as defined in claim 1, further including means for driving said inlet conveyor with a speed in excess of the momentary velocity of each pusher in the feed direction during the work stroke thereof.

3. An apparatus as defined in claim 1, including means for moving each collector pusher, during its work stroke and return stroke, in a circular path.

4. An apparatus as defined in claim 3, including means for displacing each collector pusher transversely to said feed direction during each return stroke.

5. An apparatus as defined in claim 3, including means for displacing the pushing edge and the retaining edge of each collector pusher parallel to itself during the movement in said circular path.

6. An apparatus as defined in claim 3, wherein said means for moving each collector pusher in a circular path includes a rotary disc; means for rotating said disc; means for rotatably supporting each said collector pusher on said disc, said collector pushers being spaced from the rotational center of said disc; and means for rotating each collector pusher in a direction opposite to the rotational direction of said disc.

7. An apparatus as defined in claim 6 wherein said means for rotating each collector pusher includes a first, stationary sprocket coaxial with said disc; second sprockets, one affixed to each collector pusher; and an endless chain meshing with said first and second sprockets.

8. An apparatus as defined in claim 7 wherein said collector pushers are four in number.

9. An apparatus as defined in claim 1, including means for driving said inlet conveyor with a periodically varying speed increasing from a minimum value during substantially the entire work stroke of each collector pusher, to a maximum value and decreasing rapidly from the maximum value to the minimum value.

10. An apparatus as defined in claim 1, said inlet conveyor having a side disposed adjacent said outlet conveyor; further comprising a lateral guide movably disposed along said side of said inlet conveyor; and means for moving said guide in the feed direction during at least one part of the work stroke of each said collector pusher for preventing a shift of any article of a group under formation in a direction transverse to said direction of feed and for moving said guide into a starting position prior to the engagement of the formed group by the pushing edge of a successive collector pusher.

* * * * *